(12) United States Patent
Tikhonov et al.

(10) Patent No.: US 10,744,481 B2
(45) Date of Patent: Aug. 18, 2020

(54) PACKING ELEMENT FOR HEAT AND MASS TRANSFER

(71) Applicants: Serguei Tikhonov, Bremen (DE); Lia Neumann, The Woodlands, TX (US)

(72) Inventors: Serguei Tikhonov, Bremen (DE); Lia Neumann, The Woodlands, TX (US); Yusub Ishangulyyev, Ashgabat (TM)

(73) Assignees: Serguei Tikhonov, Bremen (DE); Lia Neumann, The Woodlands, TX (US)

( * ) Notice: Subject to any disclaimer, the term of this patent is extended or adjusted under 35 U.S.C. 154(b) by 0 days.

(21) Appl. No.: 16/662,494

(22) Filed: Oct. 24, 2019

(65) Prior Publication Data

US 2020/0129954 A1  Apr. 30, 2020

(51) Int. Cl.
| | | |
|---|---|---|
| *B01J 19/30* | (2006.01) | |
| *B01J 19/32* | (2006.01) | |
| *C02F 1/26* | (2006.01) | |
| *C02F 101/12* | (2006.01) | |
| *C02F 103/10* | (2006.01) | |

(52) U.S. Cl.
CPC .......... *B01J 19/32* (2013.01); *C02F 1/26* (2013.01); *B01J 2219/322* (2013.01); *B01J 2219/32425* (2013.01); *B01J 2219/32441* (2013.01); *B01J 2219/32483* (2013.01); *C02F 2101/12* (2013.01); *C02F 2103/10* (2013.01)

(58) Field of Classification Search
CPC .......... B01J 19/32; B01J 2219/322; B01J 2219/32425; B01J 2219/32441; B01J 2219/32483; C02F 1/26; C02F 2101/12; C02F 2103/10

USPC .......................................... 261/95, DIG. 72
See application file for complete search history.

(56) References Cited

U.S. PATENT DOCUMENTS

| | | | | | |
|---|---|---|---|---|---|
| 1,676,451 | A | * | 7/1928 | Lilge ...................... | F23M 20/00 261/95 |
| 2,709,128 | A | * | 5/1955 | Krause .................... | B01J 19/32 422/310 |
| 3,752,453 | A | * | 8/1973 | Doyne ..................... | B01J 19/30 261/94 |
| 4,115,269 | A | * | 9/1978 | Bennett ................... | B01D 47/14 210/150 |
| 4,411,942 | A | * | 10/1983 | Nickel ..................... | B01J 19/32 261/94 |
| 4,668,442 | A | * | 5/1987 | Lang ....................... | B01J 19/30 261/94 |
| 4,724,593 | A | * | 2/1988 | Lang ....................... | B01J 19/30 29/896.6 |
| 5,779,886 | A | * | 7/1998 | Couture ............... | B01F 3/04765 210/150 |
| 5,783,069 | A | * | 7/1998 | Frank ...................... | B01J 19/30 210/150 |
| 6,585,237 | B2 | * | 7/2003 | Pagade ................. | B01F 5/0614 261/84 |

(Continued)

*Primary Examiner* — Charles S Bushey
(74) *Attorney, Agent, or Firm* — Renner, Otto, Boisselle & Sklar, LLP (57) ABSTRACT

Packing element for heat and/or mass transfer, including a plurality of circumferentially spaced panel shaped wall members, each wall member extending radially outward from an inner end extending along a central axis of the packing element to an outer edge opposite to the inner end and at least part of the outer edge extending along a surface of revolution having the central axis as an axis of revolution.

12 Claims, 6 Drawing Sheets

(56) References Cited

U.S. PATENT DOCUMENTS

| | | | |
|---|---|---|---|
| 6,726,838 B2 * | 4/2004 | Shechter | B01J 19/30 |
| | | | 210/150 |
| 8,496,815 B2 | 7/2013 | Brix et al. | |
| 10,464,041 B2 * | 11/2019 | Lambert | C10G 11/182 |
| 2002/0063344 A1 * | 5/2002 | Pagade | B01F 5/0614 |
| | | | 261/94 |
| 2010/0119438 A1 | 5/2010 | Becker et al. | |

* cited by examiner

PACKING ELEMENT FOR HEAT AND MASS TRANSFER

The present invention relates to a packing element, sometimes also designated as a nozzle, which can be used to fill reactor columns or tower units in which mass and/or heat transfer processes occur. Such packing elements are of the type that are often called "random" or "dumped" packings. Further, the invention relates to a reactor column for heat and/or mass transfer reactions containing a large number of packing elements according to the invention.

BACKGROUND OF THE INVENTION

Random or dumped packings, formed by a large number of packing elements, are used in reactor columns for heat and mass transfer, particularly in the chemical industry, in a three-phase system (liquid-packing element-gas).

A key factor in maximizing efficiency is the maintenance of as low a pressure difference between top and bottom of the column or tower as possible. To ensure this the packing elements should present the minimum resistance to flow. This is promoted by very open structures, but open structure alone is of limited use if the elements in the packing nest together such that parts of one packing element penetrate than the space of one or more further elements.

Another key factor is the creation of as large a contact surface as possible between the liquid and gas phases, respectively, where an intensive contact and heat and mass transfer can take place which determines the efficiency of the apparatus.

Several shapes of packing elements are known ranging from very simple to complex shapes. Most are based on an essentially cylindrical shape and differ basically in the internal structure within the cylindrical shape. The simplest structure, known as a Raschig ring, is a basic cylinder with no internal structure at all. Further known are Pall rings or structures that can be made by extrusion or injection molding.

The object of this invention is to provide a packing element and a reactor column comprising a large number of such packing elements whereby heat and mass transfer can be intensified by development of turbulent flows, increase of the specific contact surface between liquid and gas, increase of free volume and reduction of the flow resistance at elevated loads.

SUMMARY OF THE INVENTION

This object is achieved by a packing element for heat and/or mass transfer, comprising a plurality of circumferentially spaced panel shaped wall members, each wall member extending radially outward from an inner end extending along a central axis of the packing element to an outer edge opposite to the inner end, and least part of the outer edge extending along a surface of revolution defined by the central axis, i.e. having the central axis as an axis of revolution.

The surface of revolution may be a cylindrical, spherical or ellipsoidal surface. The number of wall members is not restricted and can comprise 2, 3, 4, 5 or more wall members.

While the wall members may be disposed any circumferential angular distance from each other or at any circumferential angle, the invention preferably provides that the wall members are disposed at equal circumferential angular distances, in other words, that equal circumferential angles are formed between each two directly adjacent wall members.

Preferably, at least one wall member is screw-like or helically formed, at least part of the outer edge extending along a helical line on the surface of revolution and being disposed at an angle of at least 1°, 5°, 10°, 20°, 30° or 45° relative to the central axis where an inner end of each wall member is situated. In this way, each wall member may be progressively deformed in a helical or screw-like manner, where the screw-like or helical deformation starts at the inner end, progresses as the radius does and ends at the outer edge.

At least one wall member may have at least one recess starting at the outer edge that can be formed as a slot, for example a rectangular slot, extending radially inward from the outer edge of the wall member.

The outer edge of at least one wall member may have a plurality of recesses, where projections can be formed between two adjacent recesses, and a surface area of a projection can be between 20% and 250% of a surface area of an adjacent recess, when viewed in a direction essentially vertical to a surface of the wall members.

Preferably, the invention provides that a radial depth of at least one recess is at least 5%, 10%, 20%, 30%, 50% or 75% of a radial dimension measured from the inner end to the outer edge of the wall member adjacent to the recess.

The packing element can be made of metal, in particular of stainless steel or titanium, of glass, in particular borosilicate glass, of ceramics, of plastics, in particular reinforced with glass or carbon fibers, or of a composite comprising at least one of these materials.

The invention preferably provides that all of the wall members are identical. However, at least two wall members may be different from each other in terms of shape, circumferential thickness, number and shape of recesses and helical angle between inner end and outer edge.

The invention preferably provides that a dimension in a circumferential direction, or thickness, of the wall members is constant, but it may be provided that the thickness increases from outward to inward, from the outer edge tower the inner end or central axis.

Preferably, the invention provides that a thickness of the wall members is between 0.1% and 25%, in particular between 1% and 15%, of a maximum radial or longitudinal dimension of the wall members.

The packing element can be formed in one piece, in particular by extrusion or injection molding, or can be assembled from several parts, in particular from several wall members.

The objective of the invention is further achieved by a reactor column for heat and/or mass transfer, comprising a large number of packing elements according to the invention.

Further features of the invention are described in the following description, where it is noted that all individual features and combinations thereof may be essential to the invention.

In the drawing, the invention is illustrated by means of various embodiments, without being limited thereto.

DETAILED DESCRIPTION OF THE PREFERRED EMBODIMENTS

The invention is now more particularly described with reference to the embodiments illustrated in the drawings.

Referring to FIGS. 1 to 6 of the drawing, different embodiments of an inventive packing element 1 are illustrated. In particular, FIG. 3 and FIG. 4 clearly show the spatial structure of the nozzle or packing element 1 according to the invention, which is made up by four panel shaped wall members 2, each wall member 2 extending radially outward from an inner end 2a extending along a central axis 3 of the packing element 1.

Figure 1:
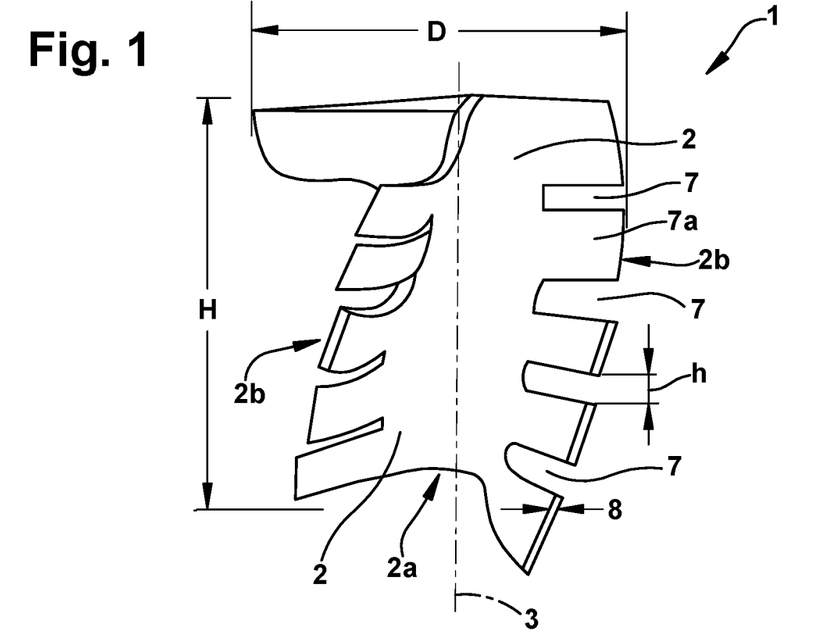
FIG. 1 shows a lateral view of a first embodiment of a packing element according to the invention.
Figure 2:
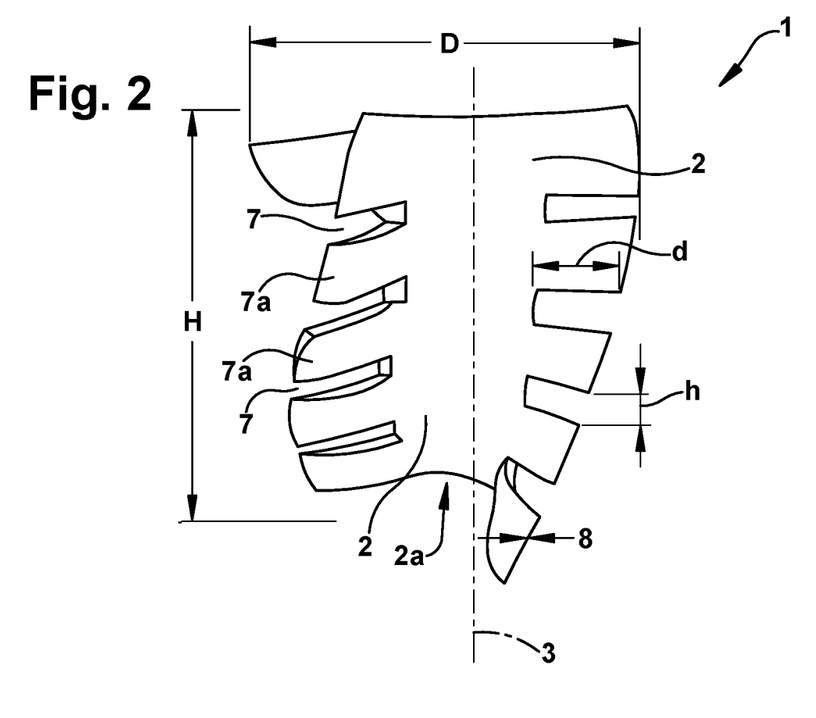
FIG. 2 shows a lateral view of another embodiment of a packing element according to the invention.
Figure 3:
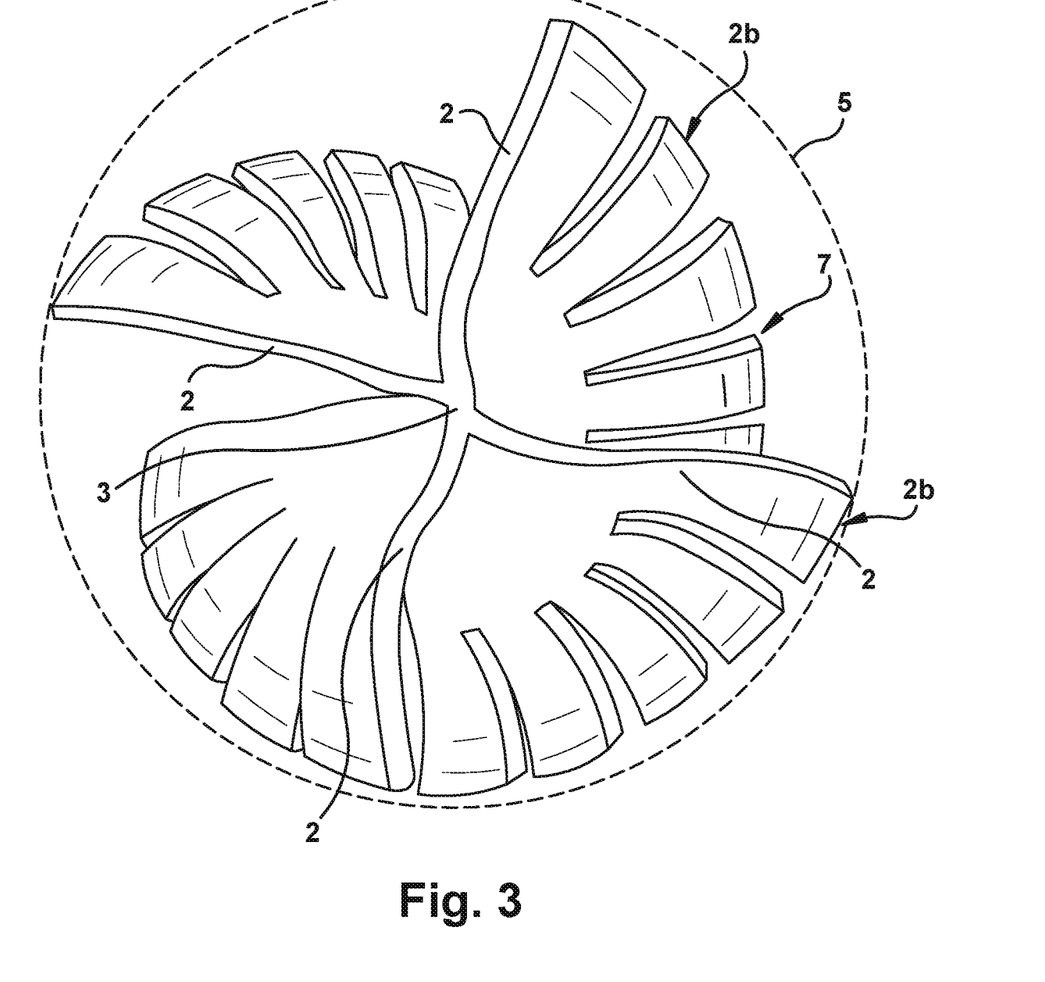
FIG. 3 shows a top view of another embodiment of a packing element according to the invention.
Figure 4:
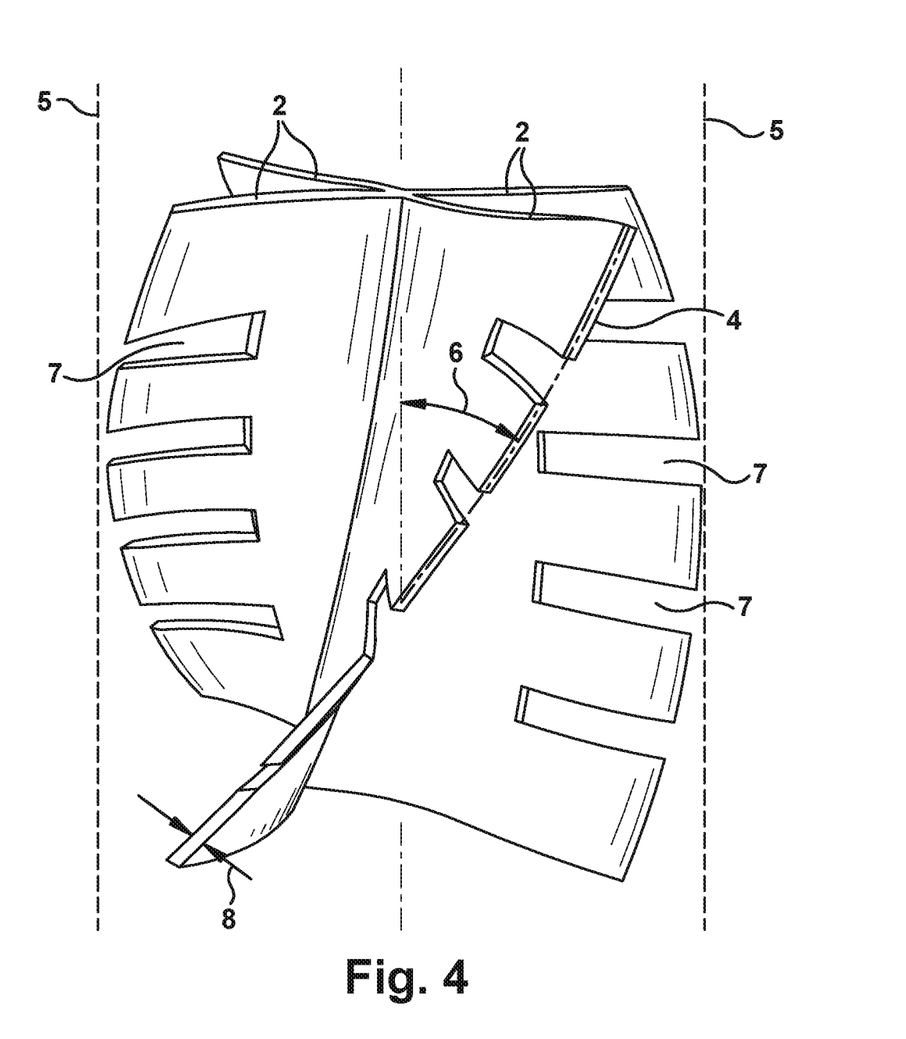
FIG. 4 shows a lateral view of the embodiment according to FIG. 3.
Figure 5:
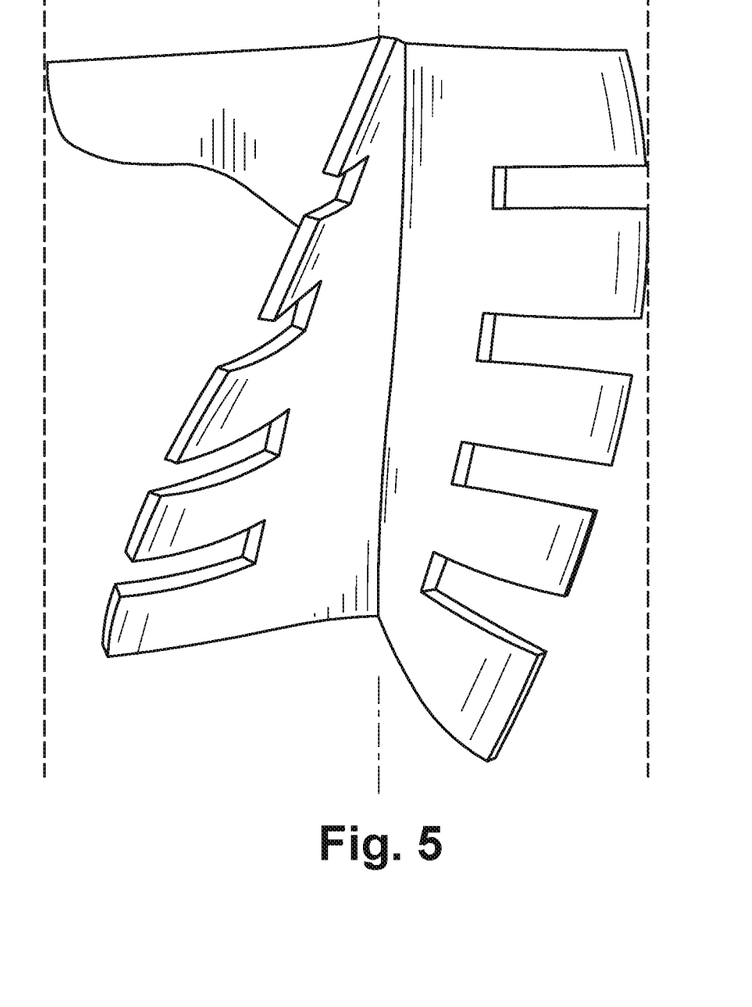
FIG. 5 shows a lateral view of an embodiment similar to FIG. 1
Figure 6:
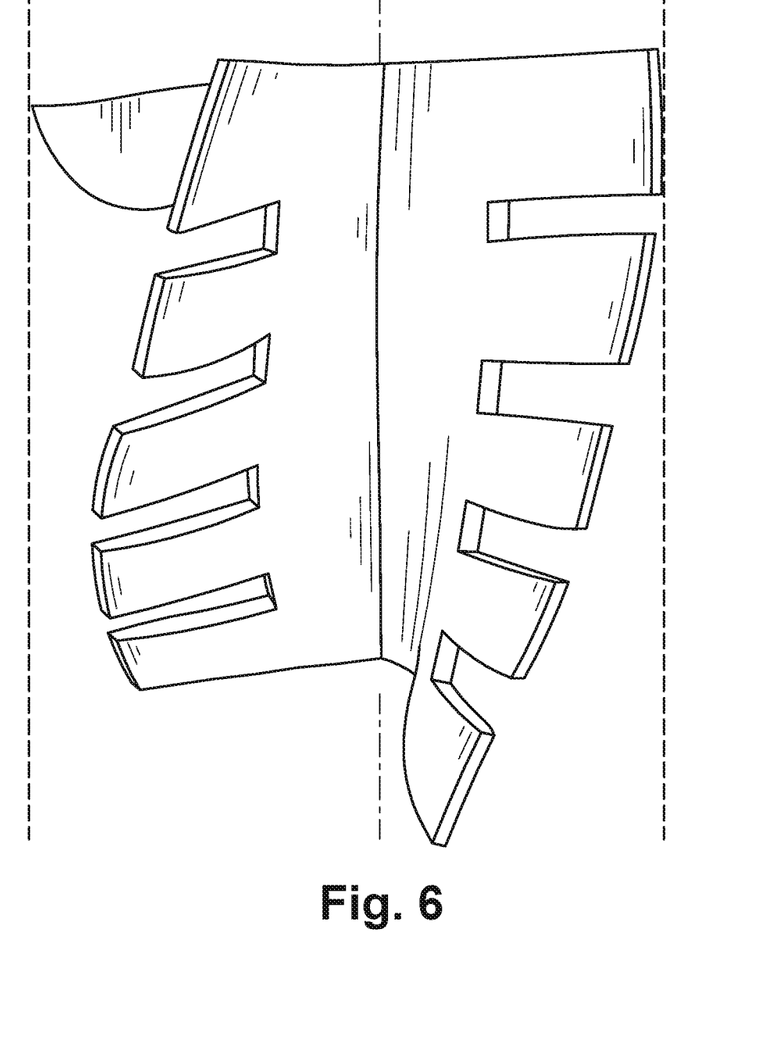
FIG. 6 shows a lateral view of the embodiment of FIG. 5.

Each wall member 2 is circumferentially spaced from two adjacent wall members 2 and extends from the central axis 3 in a radial direction to an outer edge 2b opposite to the central axis 3.

Each wall member 2 is screw-like or helically formed and can be thought as being deformed from an initially planar member by bringing the outer edge 2b into an orientation along a helical line 4 on a surface of revolution 5 disposed around and defined by the central axis 3. In this way, each wall member undergoes, starting at the central axis 3, a progressive helical or screw-like form until the outer edge 2b is reached.

The mentioned surface of revolution 5 containing the outer edges 2b of the wall members 2 may be a cylindrical surface having the central axis 3 as an axis of revolution 5. In an alternative, the surface of revolution 5 can be spherical where the central axis 3 forms a diameter of a spherical surface, or an ellipsoidal surface where the central axis 3 runs along the semi-major axis of the ellipsoidal surface.

In the embodiments shown, the outer edge 2b extends along a helical line 4 which is inclined relative to the central axis at an angle 6 of about 30°.

The wall members 2 are shown to have a number of recesses 7 starting at the outer edge 2b of the wall members 2, the recesses 7 being formed as rectangular slots extending radially inward from the outer edge 2b of each wall member 2.

In a particular example, the packing element 1 can have a diameter D between 10 mm and 200 mm, in particular between 50 mm and 100 mm and preferably 75 mm. The packing element 1 can have an axial length or height H in the direction of the central axis 3 between 10 mm and 200 mm, in particular between 50 mm and 100 mm and preferably 75 mm. The wall members 2 can have a thickness 8 between 1 mm and 10 mm, preferably between 3 mm and 6 mm and most preferably between 4 mm and 5 mm. The recesses or slots 7 can have a radial depth d of between 10 mm and 30 mm, preferably 20 mm, in the case of a diameter of 75 mm, and an axial extension h, along the central axis 3, of between 10 mm and 30 mm, preferably 20 mm, in the case of a length of 75 mm.

Tests of screw-shaped packing elements 1 according to the invention were carried out on an experimental titanium installation (FIG. 7) for air desorption and absorption of iodine from drilling waters, its diameter being 470 mm and height 5,200 mm under a layer height (bulk) of packing elements of 3,200 mm. Studies in hydrodynamics and kinetics of the process of air desorption of iodine from the drilling waters were carried out at the loads to packed column by air—4,800-6,600 m$^3$/m$^2$/hour; by drilling water—48.64 mm$^3$/m$^2$/hour.

Figure 7:
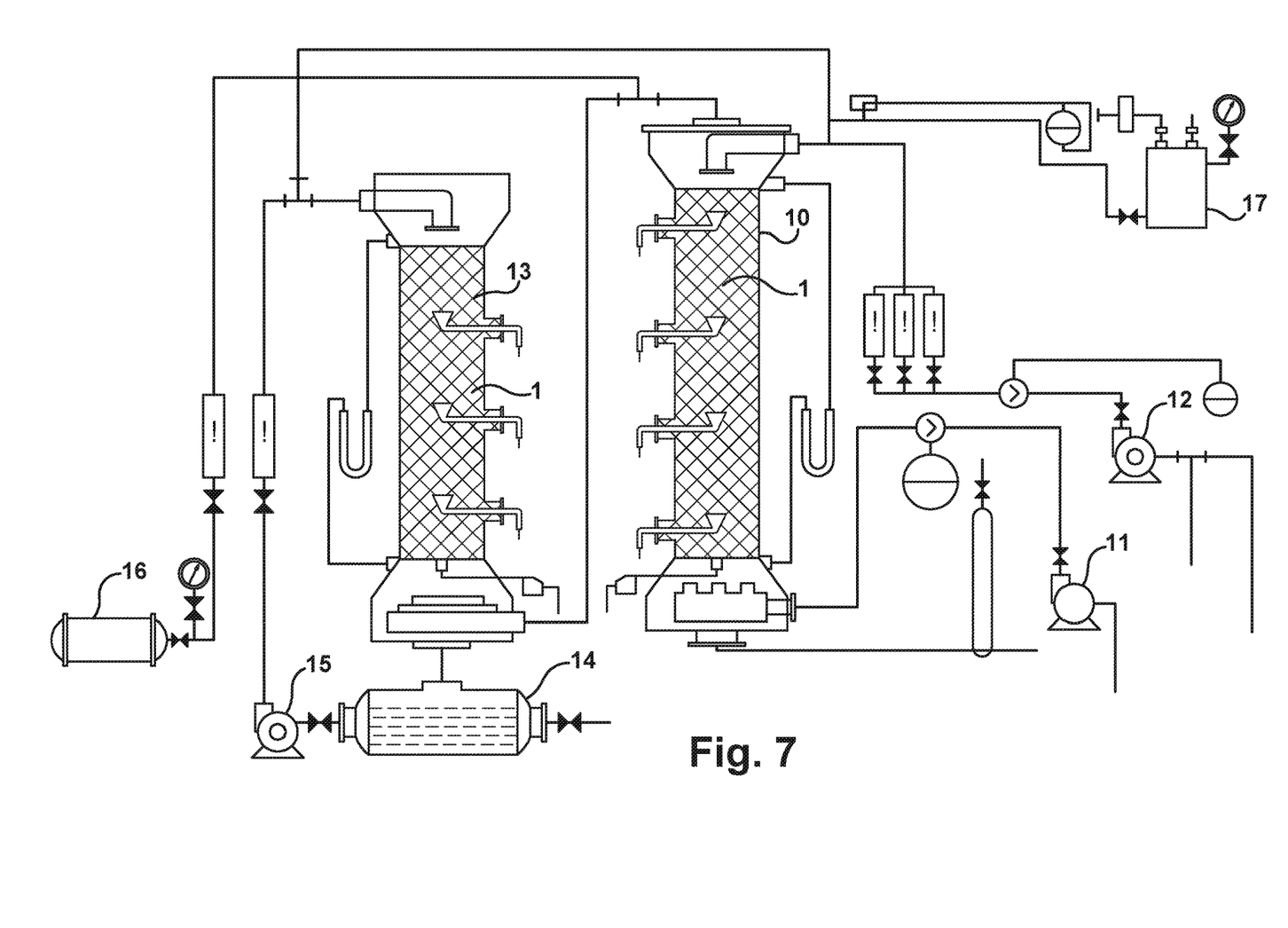
FIG. 7 shows a pilot plant using packing elements according to the invention.

The experimental-industrial pilot plant of FIG. 7 is for air desorption and absorption of iodine from drilling waters and comprises a desorber 10, packing elements (bulk) 1, air blower 11, water pump 12, absorber 13, sorbent tank 14, sorbent circulation pump 15, sulfurase anhydride container 16 and sulfuric acid tank 17.

The studies were carried out when the columns were operated with submerged and partially submerged packing elements, under various hydrodynamic modes (including the emulsified one). The results of studies in hydrodynamics and kinetics of the process of air desorption of iodine from drilling waters demonstrate the high efficiency of the screw-shaped packing element, which allows the column operating in emulsified mode or close to it, at a packing layer height of 3.2 m, to achieve the degree of iodine desorption 95%, whereas while using other types of packing elements at the iodine desorption stage (including a 2-way screw-shaped packing element) at a layer height of 12 m, the degree of iodine desorption is only 90%.

The packing element for mass exchangers according to the invention can be made up in a form of a screw having a shape close to a cylinder and can have four slots with a total area of 20 cm$^2$ on each of the four wall members of the screw surface vertically, which, compared to a previously known screw packing element, can significantly increase the mass transfer efficiency due to increased turbulization and uniform distribution of the liquid and gas phases in the desorption and absorption columns. It allows to reduce the hydraulic resistance of a screw-shaped packing element by 15-20% and due to its high operating efficiency, in a mode close to the phase inversion mode, reduce 1.5-2.0 times the height of industrial titanium installations for air desorption and absorption of iodine, which will significantly reduce the capital costs to manufacture them.

REFERENCE SIGNS 1 packing element
2 wall member
2a inner end
2b outer edge
3 central axis
4 helical line
5 surface of revolution
6 angle
7 recess
7a projection
8 thickness
D diameter
H length
d radial depth
h axial extension

The invention claimed is:

1. Packing element (i) for heat and/or mass transfer, comprising a plurality of circumferentially spaced panel shaped wall members (2), each wall member (2) extending radially outward from an inner end (2a) extending along a central axis (3) of the packing element (i) to an outer edge (2b) opposite to the inner end (2a) and at least part of the outer edge (2b) extending along a surface of revolution (5) having the central axis (3) as an axis of revolution, the outer edge (2b) of at least one wall member (2) has at least one recess (7), the recess (7) being formed as a slot starting at the outer edge (2b) and extending radially inward from the outer edge (2b) of the wall member (2).

2. Packing element according to claim 1, wherein the surface of revolution (5) is a cylindrical, spherical or ellipsoidal surface.

3. Packing element according to claim 1, wherein the number of wall members (2) comprises 2, 3, 4, 5 or more wall members (2).

4. Packing element according to claim 1, wherein the wall members (2) are disposed at equal circumferential angular distances.

5. Packing element according to claim 1, wherein at least one wall member (2) is helically formed, at least part of the outer edge (2b) extending along a helical line (4) on the surface of revolution (5) and being disposed at an angle (6) of at least 1° relative to the central axis (3).

6. Packing element according to claim 1, wherein the outer edge (2b) of at least one wall member (2) has a plurality of recesses (7), projections (7a) being formed between two adjacent recesses (7), a surface area of a projection (7a) being between 20% and 250% of a surface area of an adjacent recess (7).

7. Packing element according to claim 1, wherein a radial depth (d) of at least one recess (7) is at least 5% of a radial extension of the wall member (2) adjacent to the recess (7).

8. Packing element according to claim 1, wherein the packing element is made of metal, of glass, of ceramics, of plastics, or of a composite comprising at least one of these materials.

9. Packing element according to claim 1, wherein a circumferential thickness (8) of the wall members (2) is between 0.1% and 25%, of a maximum radial or longitudinal dimension of the wall members (2).

10. Packing element according to claim 1, wherein the packing element (i) is formed in one piece, or is assembled from several parts.

11. Reactor column for heat and/or mass transfer, comprising a large number of packing elements (i) according to claim 1.

12. Packing element according to claim 6, wherein a radial depth (d) of at least one recess (7) is at least 5% of a radial extension of the wall member (2) adjacent to the recess (7).

* * * * *